UNITED STATES PATENT OFFICE.

WILHELM BEHAGHEL AND GUSTAV KURT SCHUMANN, OF LUDWIGS-HAFEN-ON-THE-RHINE, GERMANY, ASSIGNORS TO BADISCHE ANI-LIN & SODA FABRIK, OF LUDWIGSHAFEN-ON-THE-RHINE, GERMANY, A CORPORATION.

PROCESS OF MAKING PHENYLGLYCIN SALTS.

No. 818,341.      Specification of Letters Patent.      Patented April 17, 1906.

Application filed September 21, 1905. Serial No. 279,545.

*To all whom it may concern:*

Be it known that we, WILHELM BEHAGHEL, a subject of the Grand Duke of Baden, and GUSTAV KURT SCHUMANN, a subject of the King of Saxony, doctors of philosophy and chemists, residing at Ludwigshafen-on-the-Rhine, in the Kingdom of Bavaria, German Empire, have invented new and useful Improvements in the Manufacture of Phenylglycin Salts, of which the following is a specification.

The usual method hitherto employed for the production of phenylglycin salts consists in reacting upon chloracetic acid with an excess of anilin, making the reaction mixture alkaline, and then distilling off the excess of anilin by means of steam and then filtering off the anilid, which is always formed at the same time, the phenylglycin being set free by means of acid and precipitated, thus involving a separate process for working up this anilin. The phenylglycin is, however, to a considerable extent soluble in water, and consequently the solution has had either to be evaporated or extracted with ether in order to obtain the part which had remained in solution. The method of directly evaporating the alkaline solution which is obtained after filtering off the anilid does not lead to the desired effect, since all the chlorin which comes from the chloracetic acid is contained in this solution, and consequently a mixture of phenylglycin salt and alkali chlorid results.

We have now discovered that phenylglycin salts can be prepared much more easily and good yields be obtained by converting the phenylglycin at first formed into the anilid, separating this, and then saponifying it.

The best method of carrying out our invention consists in heating, preferably *in vacuo*, the reaction mixture containing phenylglycin obtained by treating chloracetic acid with an excess of anilin and continuing this heating until water ceases to be given off. The mixture is then made alkaline, the excess of anilin is distilled off with steam, and the residual liquid is allowed to cool, whereupon the anilid, which is practically insoluble in cold water, is filtered off and washed and can thus be obtained free from inorganic impurities. The anilid can be completely saponified by heating it with a solution of one molecular proportion of caustic alkali, so that by evaporating such a solution the pure phenylglycin salt can be obtained.

The following are examples of ways in which our invention can be carried into practical effect; but our invention is not confined to these examples. The parts are by weight.

Example 1: Heat together for three (3) hours at a temperature of one hundred (100) degrees centigrade one (1) part of chloracetic acid and five (5) parts of anilin and then raise the temperature to one hundred and twenty (120) degrees centigrade and continue heating *in vacuo* at this temperature until water ceases to distil over. Then add sodium carbonate until the excess of anilin is set free and distil off this with steam. On cooling the phenylglycin anilid solidifies to a crystalline mass. Filter this off, wash with water, and then heat it in an autoclave with a solution of one (1) molecular proportion of caustic alkali. When the saponification is complete, distil off the anilin which has been split off and evaporate the resulting solution to dryness, preferably *in vacuo*.

Example 2: Boil together for three (3) hours in a reflux apparatus one (1) part of chloracetic acid, two (2) parts of water, and five (5) parts of anilin and then distil off the water *in vacuo*, finally raising the temperature to from one hundred and twenty (120) to one hundred and forty (140) degrees centigrade, maintaining this temperature until water ceases to be distilled over. Add a slight excess of caustic-soda solution, separate the aqueous layer from the anilin in which the anilid is contained, add one (1) molecular proportion of caustic-soda solution to this mixture, and then heat at a temperature of about one hundred and forty (140) degrees centigrade in an autoclave provided with a stirring apparatus. When the saponification is complete, distil off the excess of anilin and evaporate to dryness the solution of the phenylglycin salt.

Now, what we claim is—

The process of making phenylglycin salt by reacting on chloracetic acid with an excess of anilin until the phenylglycin is converted into its anilid, separating this anilid and saponifying it with caustic alkali.

In testimony whereof we have hereunto set our hands in the presence of two subscribing witnesses.

WILHELM BEHAGHEL.
GUSTAV KURT SCHUMANN.

Witnesses:
J. ALEC. LLOYD,
JOS. H. LEUTE.